April 9, 1957  G. R. CHAPMAN  2,788,247
SILAGE HANDLING MACHINE
Filed May 25, 1955  4 Sheets-Sheet 1

Inventor:
George Roland Chapman
By Munn Hare
Atty.

April 9, 1957

G. R. CHAPMAN 2,788,247

SILAGE HANDLING MACHINE

Filed May 25, 1955

Inventor:
George Roland Chapman

By Munson Khane
Atty.

April 9, 1957 G. R. CHAPMAN 2,788,247
SILAGE HANDLING MACHINE
Filed May 25, 1955 4 Sheets-Sheet 3

Inventor:
George Roland Chapman
By Munson Kane
Atty.

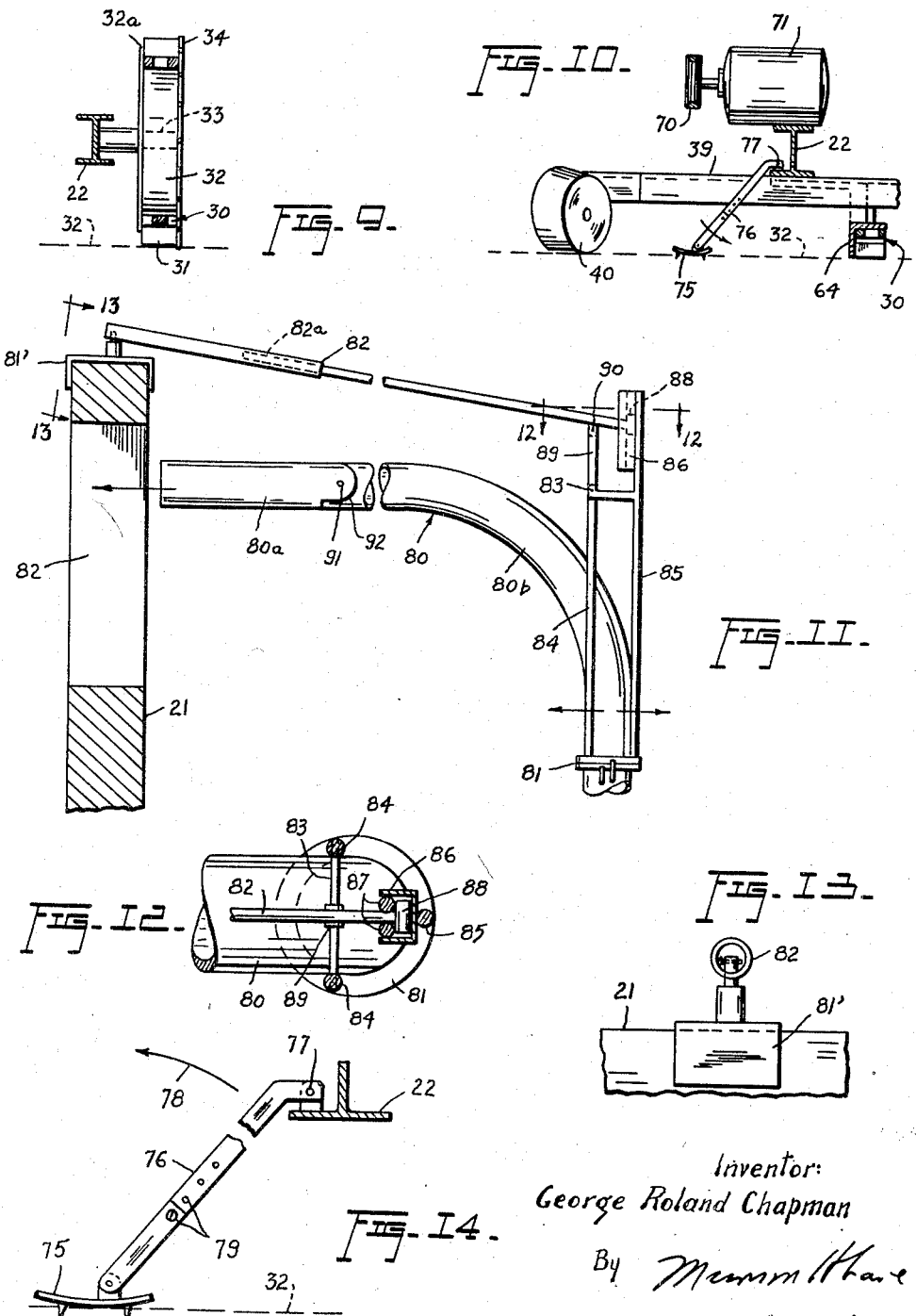

United States Patent Office 2,788,247
Patented Apr. 9, 1957

2,788,247

SILAGE HANDLING MACHINE

George Roland Chapman, Palmyra, N. Y.

Application May 25, 1955, Serial No. 510,907

8 Claims. (Cl. 302—56)

This invention relates to new and useful improvements and structural refinements in material handling apparatus, and in particular the invention concerns itself with a machine for handling silage. As such, the invention may be employed in a silo for discharging material therefrom, although it is to be understood that it may also be used out of doors, wherever picking-up and delivery of silage is to be effected.

The principal object of the invention is to provide a machine of this type which is very simple in construction and highly efficient in operation and which embodies various novel and useful features not present in conventional machines of this nature. One and a very important of these features is the arrangement of the conveyor pick-up and discharge mechanism of the machine, wherein the silage picked up by the conveyor is discharged by centrifugal force through a discharge duct, thereby eliminating the need for a positive, mechanical discharge assistant. A further important feature in this connection resides in the provision of a blower for assisting discharge of silage through the duct by air pressure alone and without positive mechanical contact of the silage with the mechanism of the blower. In this manner, the silage does not interfere with the motion of the blower and the latter is thereby more efficient in its operation.

Another important feature of the invention involves the provision of means for automatically sustaining the frame and the associate pick-up conveyor of the machine in a substantially horizontal or level position, so that the silage is picked up evenly along the length of the conveyor and along the entire path of the machine.

Another important feature of the invention resides in the provision of means for coordinating the travelling movement of the machine with the operating speed of the pick-up conveyor, so as to prevent any possibility of the conveyor working at less than its normal capacity while, at the same time, preventing the conveyor from becoming clogged with superfluous amount of silage at any one time. Further in line with this feature, the invention contemplates the provision of power means for raising the conveyor relative to the silage after periods of inactivity during which the machine may settle into the silage, thus safeguarding against accidental clogging or other obstruction of the conveyor.

Another feature of the invention resides in the provision of means for adjusting the same as to size to fit silos of different diameters.

With the foregoing more important objects and features in view and such other objects and features as may become apparent as this specification proceeds, the invention resides in the arrangement of parts and details of construction substantially as shown in the accompanying drawings, wherein like characters of reference are used to designate like parts and wherein:

Figure 9 is a sectional view, taken substantially in the plane of the line 9—9 in Figure 1;

Figure 10 is a sectional view, taken substantially in the plane of the line 10—10 in Figure 2;

Figure 11 is a fragmentary elevational view of the spout guiding means;

Figure 12 is a sectional view, taken substantially in the plane of the line 12—12 in Figure 11;

Figure 13 is a fragmentary elevational view, taken substantially in the plane of the line 13—13 in Figure 11; and Figure 14 is an elevational view of the frame raising means.

With reference now to the accompanying drawings in detail, the silage handling machine is designated generally by the numeral 20 and, for illustrative purposes, is shown as being installed in a silo, the usual cylindrical side wall of which appears in section at 21. However, it is to be understood that the invention may be also employed out of doors, so to speak, as will be hereinafter more fully explained.

Figure 6:
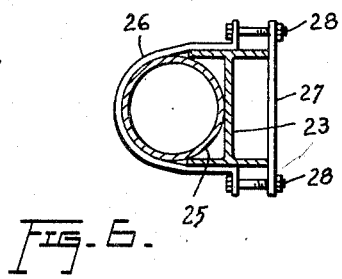
Figure 6 is a cross-sectional detail showing the clamp means for adjusting the length of the frame.

The machine 20 embodies in its construction an elongated, longitudinally extensible and retractible frame 22 which preferably consists of inner and outer I-beam members 23, 24, respectively, these members being in longitudinal alignment but having their adjacent ends spaced apart and bridged by an intermediate frame member 25 such as may be in the form of a length of pipe. The end portions of the member 25 are slidably adjustable in the adjacent end portions of the members 23, 24 and are adjustably secured thereto by U-shaped clamps 26, clamping plates 27 and bolts 28, as is best shown in Figure 6. It will be observed that by simply loosening the bolts 28, the members 23, 24, 25 may be slid relative to each other, whereby to increase or decrease the overall length of the frame in accordance with the diameter of the silo wherein the apparatus is to be installed.

Figure 1:
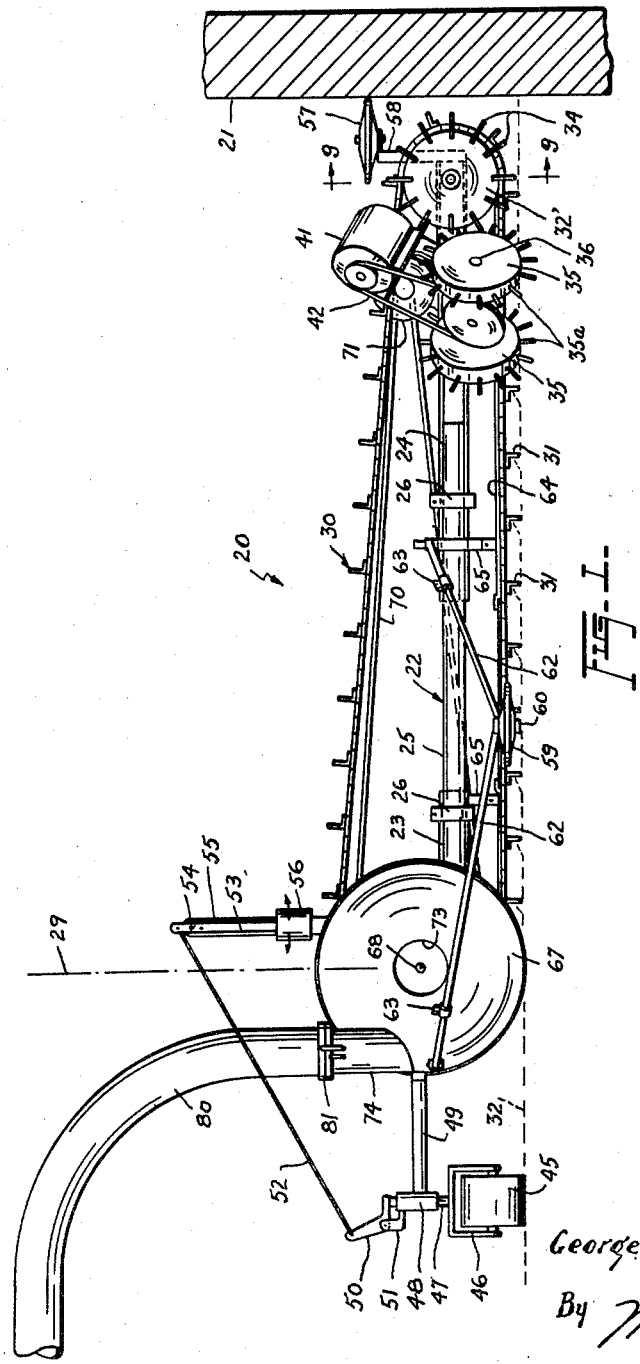
Figure 1 is a side elevational view of the invention with the spout guiding means omitted for sake of clarity.

As is best shown in Figure 1, the operating length of the frame 22 is such that it extends from the side wall 21 of the silo to and beyond the vertical center line 29 of the silo. A slat type conveyor 30 is mounted on and extends longitudinally of the frame 22, the slats 31 on the lower run of the conveyor being adapted to engage the silage 32 in the silo and draw the same radially inwardly in the silo toward the center line 29. Since the frame 22 extends as aforesaid beyond the silo center line, the conveyor 30 has an operating length extending right to the center line, so that silage at the immediate center of the silo does not remain untouched.

The conveyor 30, of course, is of the endless variety and the outer portion thereof passes around a drum-shaped guide wheel 32' which is rotatably mounted on a stub-shaft 33 projecting laterally from the frame member 24. One side of the wheel 32' is provided with a keeper flange 32a for the conveyor 30, while a plurality of radially projecting spokes or tines 34 are secured to the other side of the wheel 32' to sustain the conveyor in position on the wheel. The spokes or tines 34 also perform a further function, namely, that of engaging and agitating the silage 32 while the machine is travelling in the silo, so that the silage is broken up or loosened for proper engagement with the slats 31 of the conveyor.

Figure 5:
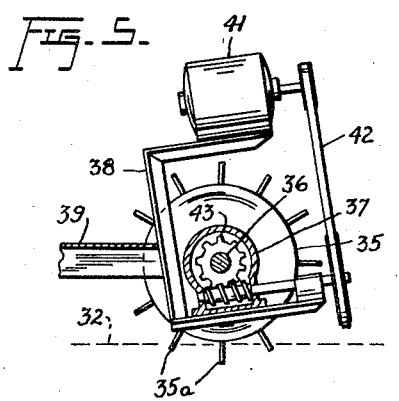
Figure 5 is a sectional view on an enlarged scale, taken substantially in the plane of the line 5—5 in Figure 2.
Figure 7:
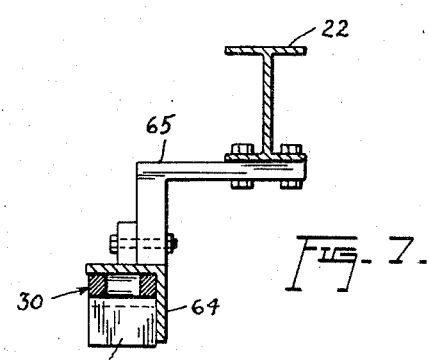
Figure 7 is a cross-sectional detail showing the attachment of the conveyor to the frame.

It may be explained at this point that the entire machine is adapted for travelling movement in a circular path in the silo, the center of such path being the axis 29 of the silo. For this purpose, the frame 22 is mounted on travelling wheels or rollers, two of these being traction wheels 35 equipped with silage engaging traction spokes 35a and mounted upon a shaft 36 extending through a gear box 37, as is best shown in Figure 5. The box 37 is mounted on a supporting framework 38 which, in turn, is secured to a cross piece 39 carried by the outer frame section or member 24. The other end of the cross piece 39 is provided with a tapered travelling roller 40, the taper and axis of which coincides with the silo axis 29. The entire machine is propelled along its circular path by an electric motor 41, or the like, mounted on the framework 38 and operatively connected to the shaft 36 by a belt drive 42 and reduction gearing 43. The direction of travel of the machine in the silo indicated by the arrow 44 in Figure 2 results from this arrangement.

The opposite, inner end of the frame 22 is supported by a travelling roller or caster 45 mounted in a yoke 46 which, in turn, is adjustable upwardly and downwardly relative to the frame by means of an upright pin 47, secured to the yoke and slidable in a sleeve 48 on an extension piece 49 of the frame. Self-levelling means are provided at this point for sustaining the frame 22 automatically in a substantially horizontal position so that the conveyor 30 may evenly engage and pick-up the silage along its entire length. These self-levelling means comprise a bell crank 50 pivoted to a bracket 51 on the sleeve 48 and operatively connected by a rope or cable 52 to a lever 53 which, in turn, is pivoted at 54 to a support 55 on the frame member 23. The lower end of the lever 53 carries a weight 56 which is of such mass as to normally sustain the yoke 46 and roller 45 in a position wherein the frame 22 is horizontal. However, if uneven action of the conveyor and/or variation in the level of the silage 32 causes the frame 22 to assume an inclined position, either inwardly or outwardly with respect to the silo axis 29, the lever 53 under the influence of the weight 56 will automatically swing to its normal, vertical position and this motion will be transmitted by the element 52 to slide the yoke 46 and roller 45 either upwardly or downwardly relative to the frame, as the case may be, so that the frame is automatically levelled.

Figure 2:
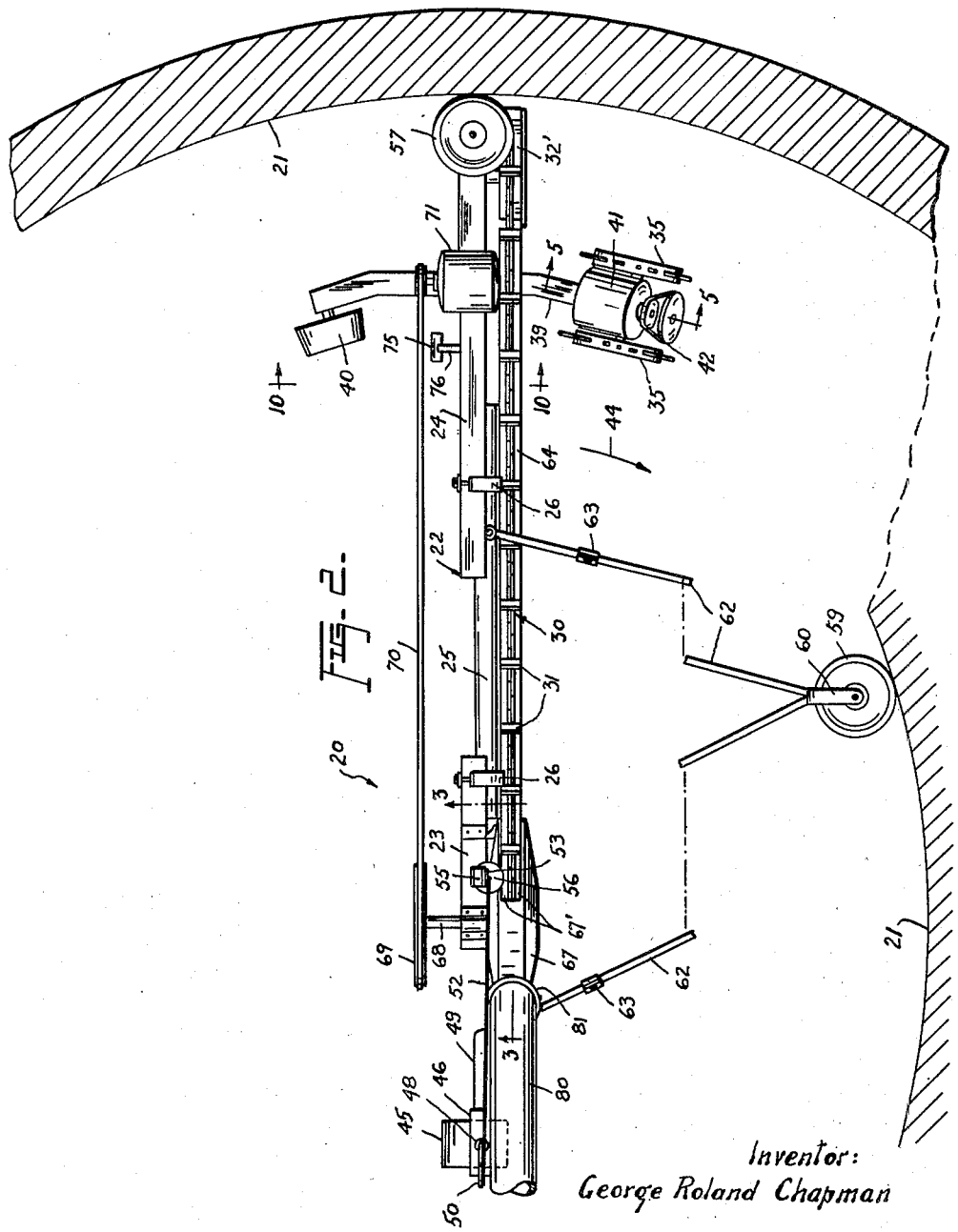
Figure 2 is a plan view thereof.
Figure 8:
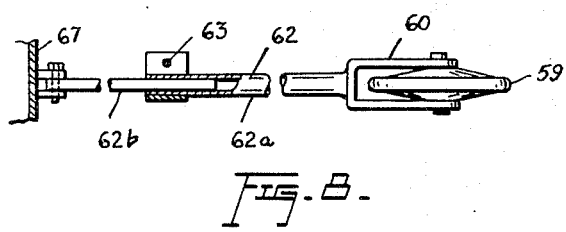
Figure 8 is an elevational or edge view, partially in section, of the frame guiding means.

Means are also provided for guiding the machine in its circular path in the silo, these means comprising a guide wheel 57 rotatably mounted by a bracket 58 at the outer end of the frame member 24 and engageable with the silo wall 21. Moreover, a second guide wheel 59 engages the silo wall at a point spaced forwardly in the direction of travel from the wheel 57, the wheel 59 being mounted in a yoke 60 carried by a pair of longitudinally adjustable arms 62 secured to the frame 22 and disposed in a convergent relation, as is best shown in Figure 2. Also, as will be apparent from Figure 8, the arms 62 consist of slidably telescoped sections 62a, 62b which are provided with suitable clamping means 63, whereby the length of the arms may be adjusted for silos of different diameters.

The lower run of the aforementioned conveyor 30 passes through or under an inverted L-shaped guide 64 which is secured to the frame 22 by suitable brackets 65, it being understood that when the frame 22 is adjusted as to length, links are taken out of or added to the conveyor as required.

Figure 3:
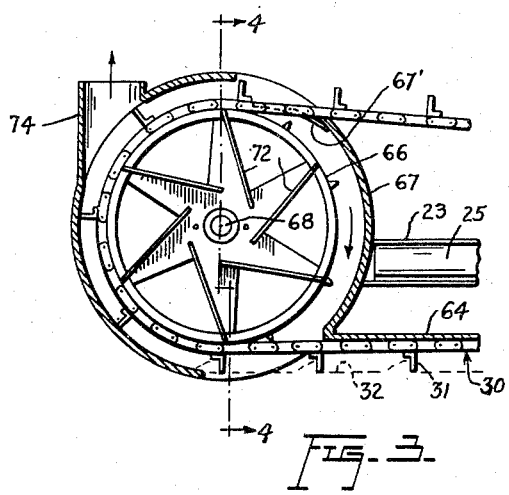
Figure 3 is a fragmentary vertical sectional view on an enlarged scale, taken substantially in the plane of the line 3—3 in Figure 2.
Figure 4:
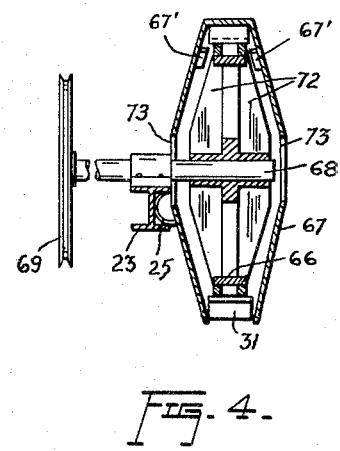
Figure 4 is a cross-sectional view, taken substantially in the plane of the line 4—4 in Figure 3.

The inner portion of the conveyor passes around a sprocket 66 rotatably mounted in a blower housing 67 which is secured to the inner member 23 of the frame 22 so that the lower run, that is, the discharge end of the conveyor reaches to the silo axis 29 and communicates with the bottom portion of the housing 67. The sprocket 66 is secured to a shaft 68 which projects outside the housing 67 and carries a pulley 69 connected by an endless belt 70 to an electric motor 71, or the like, mounted on the outer frame member 24, as is best shown in Figure 2. The sprocket 66 is equipped with a set of blower vanes 72 and air from the atmosphere may enter the housing 67 through central, laterally disposed openings 73 whereby the sprocket together with the vanes also functions as a blower. It will be also noted that the motor 71 drives the blower as well as the conveyor 30. To prevent undue escape of air from the housing 67, suitable shields or closures 67' are provided in the housing at the opposite sides of the conveyor where the upper run of the latter emerges from the housing as shown in Figures 2, 3 and 4.

The housing 67 is also equipped with an upwardly extending, tangentially disposed discharge duct 74 which communicates with the inner, discharge end of the conveyor 30 and the operational speed of the conveyor is such as to deliver silage by centrifugal force through the duct 74. This action is assisted by air under pressure created by the vanes 72 on the sprocket 66, it being particularly noted that this delivery action is effected without the silage coming into positive contact with the vanes.

It is intended that the propulsion motor 41 be equipped with a cut-out switch (not shown) operating automatically in response to a conventional repulsion start mechanism (also not shown) on the conveyor motor 71, so that as long as the conveyor motor (due to excessive load) is not operating at normal speed, the propulsion motor 41 is inactive and the machine is not propelled in its circular path until the conveyor is cleared of its excessive load and operates freely. In this manner the rotary travelling movement of the machine is coordinated with the capacity of the conveyor so that conveyor clogging is prevented. However, if after being inactive for some time the machine should settle into the silage and thus place an excessive load on the conveyor, power means are provided for raising the machine, particularly the conveyor, out of the silage, these means comprising a shoe 75 pivoted to the lower end of an arm 76 at 77 (see Figure 14) and adapted to trail or drag behind the frame 22 when the frame is travelling in the direction of the arrow 44 in normal operation. However, if the machine has settled into the silage, the motor 41 may be simply reversed so as to cause the frame to travel in an opposite direction, and wedge the shoe 75 against the silage while the arm, moving as shown at 78, will cause the outer portion of the conveyor to raise itself relative to the silage. The arm 76 is adjustable as to length by a conventional bolt and aperture arrangement indicated at 79.

The discharge duct 74 of the housing 67 is rotatably connected to a laterally extending outlet nozzle or spout 80, a conventional current collector 81 being provided at the point of connection of the duct and spout, whereby current may be delivered to the motors 41, 71, notwithstanding the travelling movement of the frame 22. The rotary connection between the duct and spout also permits the spout to remain relatively stationary while the duct is rotating with the frame. In addition, it will be noted that the axis of the duct 74 is offset laterally from the axis 29 of the silo, and accordingly, when the frame 22 travels along its circular path, the axis of the duct will shift from one side of the axis 29 to the other.

Means are provided for sustaining the spout 80 in a predetermined direction of discharge notwithstanding the rotary and shifting movement of the duct 74. These means comprise a keeper element 81' adapted for positioning on the silo wall 21 above the usual discharge opening 82 in the latter, the element 81' being pivoted to a longitudinally adjustable arm 82 which, in turn, is pivotally attached by a cross pin 83 to a pair of upstanding support rods 84 provided on the upper, relatively stationary ring of the current collector 81. The latter also carries a third, similar rod 85 which is equipped at its upper end with a channel-shaped guide 86 having tracks 87 therein engageable by a keeper bar 87 on the arm 82. The operative connection of the arm 82 to the rods 84 is by a link 89 pivoted to the arm 82 as at 90 and connected to the rods 84 by the aforementioned pin 83. Since the arm 82 is self-adjusting as to length by a slidably telescoped arrangement 82a of a conventional nature, the spout 80 is permitted to shift laterally toward and away from the axis 29 of the silo during movement of the frame 22 along its circular path. Also, the two rods 84, being disposed at opposite sides of the spout 80, prevent the spout from rotating with the duct 74, whereby the spout is directed at all times to discharge through the silo opening 82. As the machine dispenses the silage from the silo and descends with the silage level, the spout 80 is correspondingly free to descend with the machine to the lower edge of the opening 82. Thereupon, the spout 80 may be aligned with the next underlying opening of the silo by simply disconnecting an outer portion 80a of the spout from the inner portion 80b upon removal of a hinge pin 91, it being noted that the two spout sections 80a and 80b are formed with coacting hinge portions 92 which permit the outer portion 80a to become inclined while the inner portion 80b descends with the machine through the usual space between the adjacent silo openings.

In the foregoing the invention has been described as being placed in a silo. However, the machine is equally well adapted for work out of doors, so to speak, that is, wherever silage is to be picked up and transferred from one location to another. In the last named instance the circular travelling motion of the machine, of course, may be dispensed with and the frame 22 mounted upon a tractor, or the like, for travelling along a straight path, as the case may be.

While in the foregoing there has been described and shown the preferred embodiment of the invention, various modifications may become apparent to those skilled in the art to which the invention relates. Accordingly, it is not desired to limit the invention to this disclosure, and various modfications may be resorted to, such as may lie within the spirit and scope of the appended claims.

What is claimed as new is:

1. In a silage handling machine, the combination of an elongated travelling frame, a slat type silage conveyor extending longitudinally of said frame, a discharge duct provided at one end of said conveyor, and means for driving said conveyor whereby the slats thereof may deliver silage by centrifugal force through said duct.

2. In a silage handling machine, the combination of an elongated travelling frame, means carried by said frame for propelling the same, a housing provided at one end of the frame, a slat type silage conveyor extending longitudinally of the frame and discharging into said housing, a discharge duct provided tangentially on said housing, a blower provided in said housing, and means for driving said conveyor and said blower whereby the slats of said conveyor may deliver silage by centrifugal force through said duct in assistance of said blower.

3. The machine as defined in claim 2 wherein said blower is out of contact with silage in said housing.

4. A silage handling machine comprising an elongated frame adapted for travelling movement in a circular path having its center adjacent one end of the frame, a slat type silage conveyor extending longitudinally of said frame and having its discharge end substantially at the center of said circular path, a housing mounted on the frame and having the discharge end of said conveyor in communication with the bottom thereof, an upwardly extending discharge duct provided tangentially on said housing, a rotary blower provided in said housing out of contact with silage therein, power means on said frame for simultaneously driving said conveyor and said blower, whereby the slats of said conveyor may deliver silage by centrifugal force through said duct in assistance of the blower, and means for sustaining said duct in a predetermined direction of discharge notwithstanding the circular travelling movement of said frame.

5. A silage handling machine comprising an elongated and longitudinally adjustable frame adapted for travelling movement in a circular path having its center adjacent one end of the frame, a power driven travelling wheel unit provided at the outer end of the frame, a vertically adjustable travelling roller provided adjacent the inner end of the frame, gravity-responsive pendulum actuated means carried by the frame for vertically adjusting said roller whereby to automatically sustain the frame in a substantially horizontal position, a slat type silage conveyor extending longitudinally of the frame and having its discharge end substantially at the center of said circular path, a housing mounted at the inner end of the frame and having the discharge end of said conveyor in communication with the bottom thereof, a discharge duct provided tangentially on said housing and extending upwardly therefrom, a laterally angulated spout provided on said duct, a rotatable connection between said spout and the duct whereby the spout may be sustained in a predetermined direction of discharge notwithstanding rotation of the duct relative thereto, silo engaging means for sustaining said spout in a predetermined direction of discharge, a blower provided in said housing out of contact with the silage therein, and power means on said frame for driving said conveyor and said blower, whereby the slats of said conveyor may deliver silage by centrifugal force through said duct and spout in assistance of said blower.

6. The machine as defined in claim 5 together with power actuated means provided on said frame for raising the same and the associated conveyor relative to the silage, said last mentioned means comprising an arm pivoted to said frame and extending downwardly therefrom in a direction opposite to that of its travel, and a silage engaging shoe provided at the free end of said arm, said arm being of such length and capable of wedging itself against the frame when the direction of frame travel is reversed, whereby to raise the frame relative to the silage.

7. In a silage handling machine, the combination of a substantially disc-shaped housing disposed in a vertical plane and provided at the bottom thereof with an intake opening, an upwardly extending discharge duct provided tangentially on said housing, a sprocket wheel rotatable in the housing, an endless conveyor chain extending into the housing and engaging said sprocket wheel, said chain having upper and lower runs and the lower run thereof passing inwardly through said intake opening, silage engaging slats provided on said chain, and means for driving said sprocket wheel, whereby the slats of the chain may deliver silage by centrifugal force through said housing and said duct.

8. The device as defined in claim 7 together with a set of blower vanes provided at opposite sides of said sprocket wheel out of contact with silage delivered into said housing by said slats, whereby to assist centrifugal force in delivering silage through said duct.

References Cited in the file of this patent

UNITED STATES PATENTS

| 2,437,138 | Theis | Mar. 2, 1948 |
|---|---|---|
| 2,651,438 | Peterson | Sept. 8, 1953 |
| 2,671,696 | McLean | Mar. 9, 1954 |
| 2,677,474 | Long | May 4, 1954 |
| 2,678,241 | Miller | May 11, 1954 |
| 2,719,058 | Van Dusen | Sept. 27, 1955 |